May 10, 1932.

L. PIGNANELLI

SHOE

Re. 18,461

Original Filed Aug. 17, 1926

2 Sheets-Sheet 1

INVENTOR
Luigi Pignanelli
BY
Pierre Barnes
ATTORNEY

L. PIGNANELLI

May 10, 1932.

SHOE

Re. 18,461

2 Sheets-Sheet 2

Original Filed Aug. 17, 1926

INVENTOR
Luigi Pignanelli
BY
Pierre Barnes
ATTORNEY

Reissued May 10, 1932

Re. 18,461

UNITED STATES PATENT OFFICE

LUIGI PIGNANELLI, OF TACOMA, WASHINGTON

SHOE

Original No. 1,682,184, dated August 28, 1928, Serial No. 129,703, filed August 17, 1926. Application for reissue filed October 17, 1931. Serial No. 569,451.

This invention relates to shoes and, more especially, to that class known as "turned" shoes.

The object of my invention, generally stated, is to provide a light weight shoe which will retain its shape, be more comfortable to wear, stronger, and more durable than hitherto.

More specific objects and advantages of the invention will appear in the following description.

The invention consists in the novel shape of the vamp portion of a shoe upper, the provision of a most advantageous manner of coupling free edges of the same, and in connecting the edge-coupled upper to the shoe sole.

In the accompanying drawings,—

Figure 1:
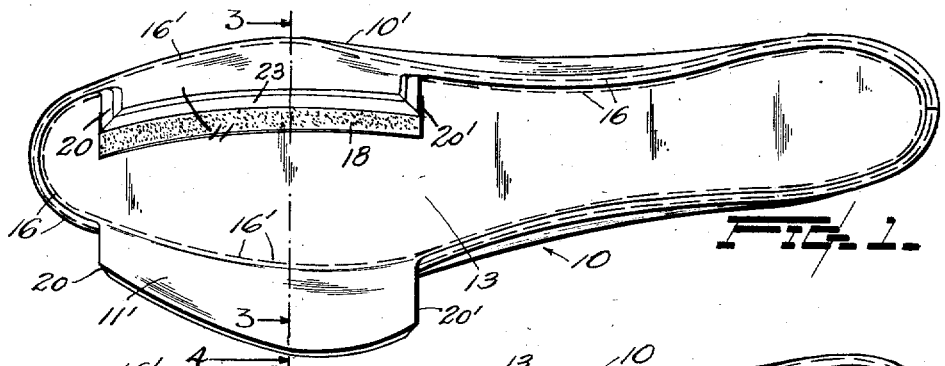
Figure 2:
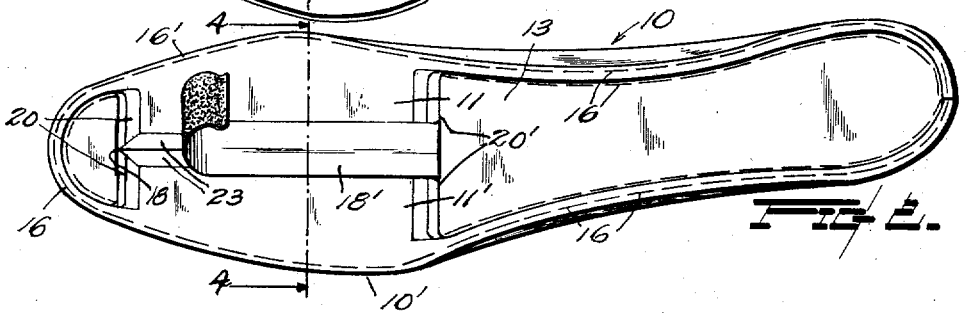
Figure 3:
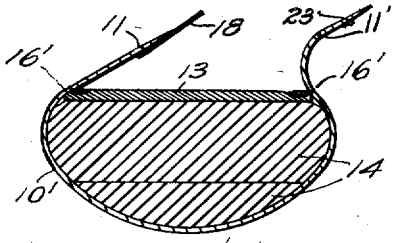
Figure 4:
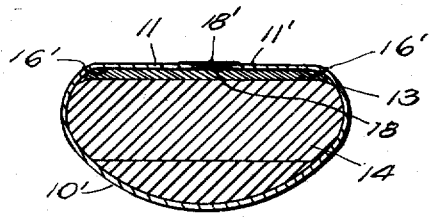
Figure 5:
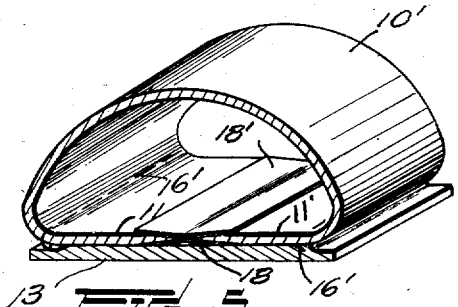
Figure 6:
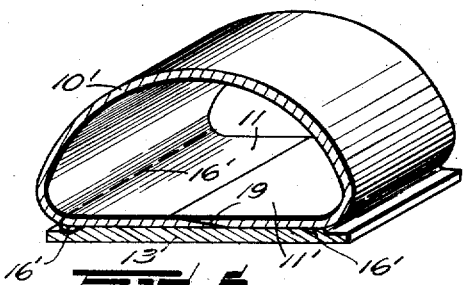
Figure 8:
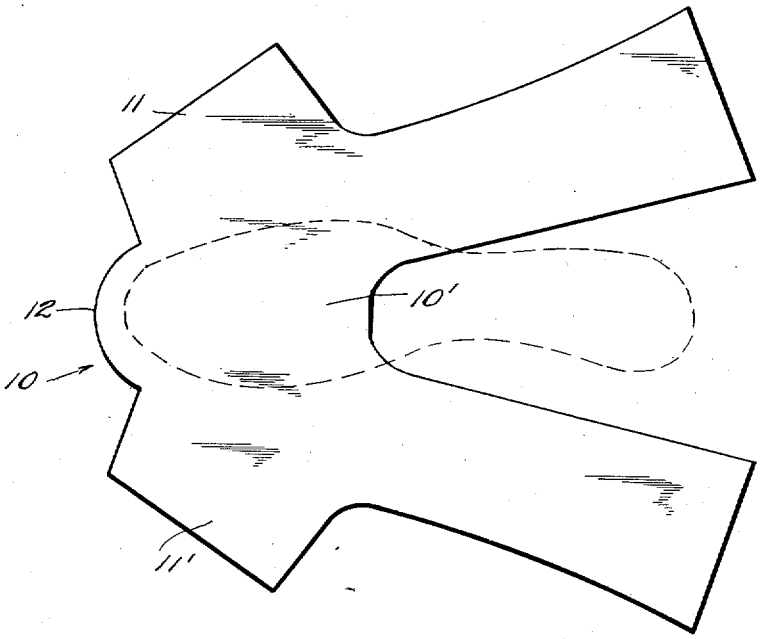
Figure 7:
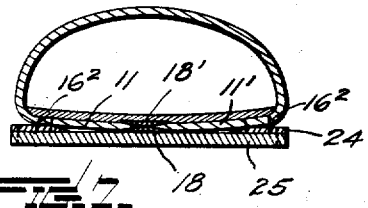

Figure 1 is a plan view of parts of a turned shoe embodying my improvements, the shoe upper being illustrated as lasted and sewed to the sole; Figure 2 is a similar view with the flaps of the upper joined together above the sole; Figure 3 is a transverse sectional view on line 3—3 of Figure 1; Figure 4 is a transverse sectional view on line 4—4 of Figure 2; Figure 5 is a fragmentary perspective view of the shoe illustrated in Figures 2 and 4 as it appears when turned right side out; Figure 6 is a fragmentary sectional view of a shoe turned right side out, wherein the meeting ends of the upper's flaps are shown as scarfed with respect to each other; Figure 7 is a transverse sectional view of a welt shoe embodying the invention; Figure 8 is an expanded view of an upper shaped according to the present invention; and Figure 9 is a view similar to Figure 6 showing the invention as employed with a vamp.

Figure 9:
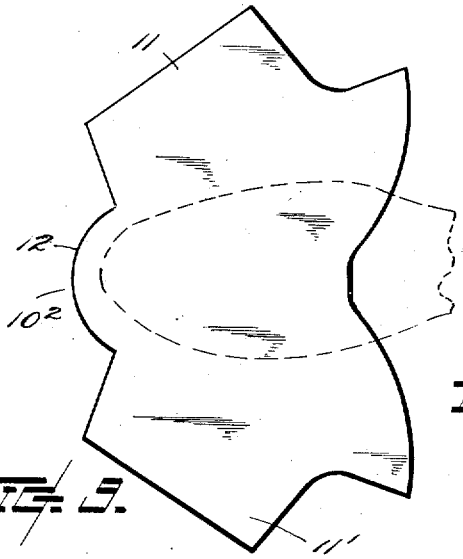

In carrying out the invention, a shoe upper, as 10, is shaped to provide in a single piece two complementary flap elements 11 and $11^1$ extending from opposite sides of a vamp portion $10^1$ of a full upper (Figure 8) or of a vamp upper $10^2$, as shown in Figure 9.

Longitudinally of the upper said flaps are disposed in proximity to its toe end 12 and of a width to extend to the rear of the ball part of the shoe.

Transversely of the upper, said flaps are of lengths to enable them, when the upper is lasted, to have their free ends joined together at, or in proximity to, the midwidth of the sole.

In applying my invention to a turned shoe, the shoe sole 13, after being shaped and channeled, is temporarily secured by means of tacks to a last 14 with the grain side of the leather, or the surface which is to serve as the bottom, next the last as usual with a turned shoe. My improved upper as 10 (or $10^2$, Figure 9) is then placed, wrong side out, about the last to have the edges of the upper overlap the edge of the sole 13 and to which it is sewed, the stitches being idicated by 16 and $16^1$ extending across those parts of the upper proper (Figures 1 and 3) from which the flaps protrude. The flaps are then turned down upon the sole to have their free ends meet or nearly so.

In Figures 2 and 4 the outer or free ends of the flaps are shown in side by side relation and, thus arranged, are coupled together, preferably by means of flexible strips 18 and $18^1$ which are glued or cemented to the under and upper surfaces, respectively, of the flaps. A strip which is found to be suitable for joining the flaps is afforded by what is known as adhesive tape—that is to say, a fabric strip having an adhesive material applied to one surface thereof.

In practice the flaps' front and rear edges are chamfered as at 20 and $20^1$ to eliminate sharp corners; and the edges of the flaps to which the joining strips are applied are advantageously chamfered, as at 23, to compensate for the thickness of said strips.

In Figure 6 the flaps are shown as joined without the use of strips, by elongating the flaps, transversely of the shoe and cementing, as at 19, the overlapping chamfered portions of the flaps together.

After the upper has been sewed to the sole and the flaps secured to each other, as above explained, the last 14 is taken out. The shoe is then turned right side out and the last reinserted preparatory to hammering or otherwise bringing the shoe into proper form.

In Figure 7 I illustrate the invention as applied to a welt shoe, wherein 24 represents the welt which is sewed as by stitches $16^2$ to the flaps 11, $11^1$, or to the vamp $10^1$ proper in proximity to the respective flaps, the sole 25 being sewed in the usual manner to said welt. Beside the sewing of an upper by stitches 16 and $16^1$ to the shoe sole it may be further secured by cementing the flaps directly to the sole.

According to my invention a shoe is provided with a bridge piece, see Figures 5, 6 and 7, constituted of the upper's companion flaps 11 and $11^1$ which are joined together and extend across the sole at the ball thereof and serve as a tie to couple the opposite sides of the vamp together supplementary to their sewed connection $16^1$ with the sole. It is to be noted that in the present invention, the flap elements 11 and $11^1$ are not sewed or otherwise secured to the vamp of the upper, but are integral therewith—that is to say, an upper, or vamp, is shaped of a single piece to afford the flaps.

By such construction dependence is not had upon the strength of the stitches to hold the flaps to the upper. Moreover, flaps coextensive with the vamp at the ball obviates the presence of ridges which would chafe or bruise the foot.

It is to be noted that the stitches $16^1$ serve to secure the vamp or upper to the sole, but the flaps which are secured to each other and to the sole, if desired, serve to prevent the spreading apart of the lower side portions of the vamp or the breaking away transversely of the latter from the sole when the shoe is strained or subjected to walking stresses. With the present invention a relatively thin sole and insole may advantageously be employed to afford a lightweight shoe which is especially desirable with women's wear.

What I claim is:

1. In a shoe, a sole, an upper, said upper being shaped to provide two complementary flap elements disposed in spaced apart relation with respect to both ends of the upper, and adhesive tape for securing the free ends of the flaps together, said upper being secured to the sole.

2. An upper for a shoe providing flap elements projecting laterally from each side of the vamp, the outer edges of said flaps being chamfered for the application of a strip of adhesive tape over the same in connecting said flaps together.

3. An upper for a shoe providing flap elements projecting laterally from each side of the vamp, the outer edges of said flaps being chamfered, and means for adhesively connecting said chamfered edges to couple the flaps together.

4. In a shoe, a sole, an upper, said upper being shaped to provide complementary flap elements adapted to overlie the shoe sole, and an adhesively coated ligament for connecting the free ends of said flap elements.

5. In a shoe, a sole, an upper, said upper being shaped to provide complementary flap elements adapted to overlie the shoe sole, and means for adhesively coupling the free ends of said flap elements.

6. In a shoe, a sole, an upper shaped to provide in a single piece with the vamp a flap projecting laterally therefrom and turned inwardly above the sole, and means adhesively coupling said laterally projecting flap with the opposite edge of the upper across the ball portion of the sole.

Signed at Portland, Oregon, this 24th day of September, 1931.

LUIGI PIGNANELLI.